(12) United States Patent
Takano et al.

(10) Patent No.: US 10,948,664 B2
(45) Date of Patent: Mar. 16, 2021

(54) INGRESS PROTECTED OPTICAL FIBER CONNECTOR HAVING A REDUCED DIAMETER WITH A REMOVABLE RETAINING NUT

(71) Applicant: Senko Advanced Components Inc, Marlborough, MA (US)

(72) Inventors: Kazuyoshi Takano, Tokyo (JP); Paul Newbury, Ashland, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/394,434

(22) Filed: Apr. 25, 2019

(65) Prior Publication Data
US 2019/0346634 A1 Nov. 14, 2019

Related U.S. Application Data

(60) Provisional application No. 62/668,483, filed on May 8, 2018.

(51) Int. Cl.
*G02B 6/38* (2006.01)

(52) U.S. Cl.
CPC ......... *G02B 6/3887* (2013.01); *G02B 6/3825* (2013.01); *G02B 6/3891* (2013.01)

(58) Field of Classification Search
None
See application file for complete search history.

(56) References Cited

U.S. PATENT DOCUMENTS

| | | |
|---|---|---|
| 6,116,790 A | 9/2000 | Vergeest |
| 6,409,393 B1 | 6/2002 | Grois et al. |
| 6,542,674 B1 | 4/2003 | Gimblet |
| 6,546,175 B1 | 4/2003 | Wagman |
| 6,585,423 B1 | 7/2003 | Vergeest |
| 6,648,520 B2 | 11/2003 | McDonald |
| 6,714,710 B2 | 3/2004 | Gimblet |
| 6,785,450 B2 | 8/2004 | Wagman |
| 6,899,467 B2 | 5/2005 | McDonald |
| 6,908,233 B2 | 6/2005 | Nakajima et al. |
| 7,001,079 B2 | 2/2006 | Vergeest |
| 7,090,406 B2 | 8/2006 | Melton |
| 7,090,407 B2 | 8/2006 | Melton |
| 7,111,990 B2 | 9/2006 | Melton |
| 7,113,679 B2 | 9/2006 | Melton |
| 7,118,283 B2 | 10/2006 | Nakajima et al. |
| 7,234,875 B2 | 6/2007 | Krowiak |
| 7,241,056 B1 | 7/2007 | Kuffel |
| 7,264,402 B2 | 9/2007 | Theuerkorn |
| 7,281,856 B2 | 10/2007 | Grzegorzewska |
| 7,344,317 B2 | 3/2008 | Krowiak |
| 7,429,136 B2 | 9/2008 | Lewallen |
| 7,467,896 B2 | 12/2008 | Melton |
| 7,476,035 B2 | 1/2009 | Cull et al. |

(Continued)

*Primary Examiner* — Jerry Rahll
(74) *Attorney, Agent, or Firm* — Edward S. Jarmolowicz, Esq.

(57) ABSTRACT

An optical connector assembly having an adapter with a first and second end. Either end can accept a connector with a removable, detachable and replaceable coupling nut that when removed, connector outer diameter is substantially reduced, thereby allowing said connector to be inserted through a conduit having an inner diameter substantially less than outer diameter of separable coupling nut.

8 Claims, 13 Drawing Sheets

(56) References Cited

U.S. PATENT DOCUMENTS

| | | |
|---|---|---|
| 7,539,380 B1 | 5/2009 | Abernathy et al. |
| 7,559,700 B2 | 7/2009 | Eguchi et al. |
| 7,567,741 B2 | 7/2009 | Abernathy et al. |
| 7,572,065 B2 | 8/2009 | Lu |
| 7,654,747 B2 | 2/2010 | Theuerkorn |
| 7,654,748 B2 | 2/2010 | Kuffel |
| 7,744,286 B2 | 6/2010 | Lu |
| 7,744,288 B2 | 6/2010 | Lu |
| 7,762,726 B2 | 7/2010 | Lu |
| 7,785,015 B2 | 8/2010 | Melton |
| 7,785,019 B2 | 8/2010 | Lewallen |
| 7,796,853 B2 | 9/2010 | Abernathy et al. |
| 7,881,576 B2 | 2/2011 | Melton |
| 7,891,882 B2 | 2/2011 | Kuffel |
| 7,918,609 B2 | 4/2011 | Melton |
| 7,942,590 B2 | 5/2011 | Lu |
| 7,959,361 B2 | 6/2011 | Lu |
| 8,052,333 B2 | 11/2011 | Kuffel |
| 8,202,008 B2 | 6/2012 | Lu |
| 8,231,282 B2 | 7/2012 | Kuffel |
| 8,297,850 B2 | 10/2012 | Nishioka |
| 8,348,519 B2 | 1/2013 | Kuffel |
| 8,414,196 B2 | 4/2013 | Lu |
| 8,496,384 B2 | 7/2013 | Kuffel |
| 8,506,173 B2 | 8/2013 | Lewallen |
| 8,573,859 B2 | 11/2013 | Larson |
| 8,672,560 B2 | 3/2014 | Haley |
| 8,699,467 B2 | 4/2014 | Lindoff |
| 8,714,835 B2 | 5/2014 | Kuffel |
| 8,770,862 B2 | 7/2014 | Lu |
| 8,814,441 B2 | 8/2014 | Strasser et al. |
| 8,840,320 B2 | 9/2014 | Park |
| 8,939,654 B2 | 1/2015 | Lu |
| 9,103,995 B2 | 8/2015 | Park |
| 9,239,441 B2 | 1/2016 | Melton |
| 9,291,780 B2 | 3/2016 | Lu |
| 9,304,262 B2 | 4/2016 | Lu |
| 9,310,570 B2 | 4/2016 | Busse |
| 9,397,441 B2 | 7/2016 | Sun |
| 9,442,257 B2 | 9/2016 | Lu |
| 9,482,829 B2 | 11/2016 | Lu |
| 9,519,114 B2 | 12/2016 | Zimmel |
| 9,535,230 B2 | 1/2017 | Newbury |
| 9,664,862 B2 | 5/2017 | Lu |
| 9,684,138 B2 | 6/2017 | Lu |
| 9,733,436 B2 | 8/2017 | Van Baelen |
| 9,739,951 B2 | 8/2017 | Busse |
| 9,854,151 B2 | 12/2017 | Endo |
| 9,964,715 B2 | 5/2018 | Lu |
| 9,983,366 B2 | 5/2018 | Bund |
| 10,012,802 B2 | 7/2018 | Newbury |
| 10,101,538 B2 | 10/2018 | Lu |
| 10,114,176 B2 | 10/2018 | Gimblet |
| 10,146,015 B2 | 12/2018 | Zimmel |
| 10,162,126 B2 | 12/2018 | Elenbaas |
| 10,180,541 B2 | 1/2019 | Coenegracht |
| 10,197,739 B2 | 2/2019 | Ohtsuka |
| 10,234,641 B2 | 3/2019 | Hill |
| 10,317,628 B2 | 6/2019 | Van Baelen |
| 10,338,323 B2 | 7/2019 | Lu |
| 10,401,578 B2 | 9/2019 | Coenegracht |
| 10,451,811 B2 | 10/2019 | Coenegracht |
| 10,473,866 B2 | 11/2019 | Newbury |
| 10,502,907 B2 | 12/2019 | Wang |
| 10,613,278 B2 | 4/2020 | Kempeneers et al. |
| 2006/0045428 A1 | 3/2006 | Theuerkorn |
| 2008/0273855 A1 | 11/2008 | Bradley |
| 2009/0257717 A1 | 10/2009 | Liu |
| 2010/0329267 A1 | 12/2010 | Sakamoto |
| 2011/0217017 A1* | 9/2011 | Drouard .............. H02G 3/088 |
| | | 385/135 |
| 2011/0222826 A1 | 9/2011 | Blackburn |
| 2013/0136398 A1 | 5/2013 | Isenhour |
| 2015/0301294 A1* | 10/2015 | Chang .............. G02B 6/3887 |
| | | 385/87 |
| 2017/0227719 A1 | 8/2017 | Zimmel |
| 2018/0224610 A1 | 8/2018 | Pimentel |
| 2018/0231720 A1 | 8/2018 | Lu |
| 2019/0107667 A1 | 4/2019 | Huang |
| 2019/0107677 A1 | 4/2019 | Coenegracht |
| 2019/0146161 A1 | 5/2019 | Elenbaas |
| 2019/0179088 A1 | 6/2019 | Zimmel |
| 2019/0235177 A1 | 8/2019 | Lu |
| 2019/0302389 A1 | 10/2019 | Newbury |
| 2019/0324217 A1 | 10/2019 | Lu |
| 2019/0369336 A1 | 12/2019 | Van Baelen |
| 2020/0003965 A1 | 1/2020 | Coenegracht |
| 2020/0012051 A1 | 1/2020 | Coenegracht |
| 2020/0241218 A1 | 7/2020 | Kempeneers et al. |

* cited by examiner

INGRESS PROTECTED OPTICAL FIBER CONNECTOR HAVING A REDUCED DIAMETER WITH A REMOVABLE RETAINING NUT

CROSS REFERENCE TO RELATED APPLICATIONS

This Application claims priority to U.S. Provisional 62/668,483 title "Ingress Protected Optic Fiber Connector Having A Reduced Diameter", filed May 8, 2018 and incorporated by reference into this Application.

FIELD OF THE INVENTION

The present disclosure relates generally to fiber optic connectors and systems, and specifically to ultra-slender optical fiber connectors with replaceable, removable structure that is detachable from an outer housing of a connector body thereby reducing outer diameter of said connector, and to ingress protected connectors and system to prevent environment damage of fiber optic ferrule assembly that contains fibers used to carry light representing information.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, room for improvement in the area of data centers, specifically as it relates to fiber optic connects, still exists. For example, manufacturers of connectors and adapters are always looking to reduce the size of the devices, while increasing ease of deployment, robustness, and modifiability after deployment. In particular, more optical connectors may need to be accommodated in the same footprint previously used for a smaller number of connectors in order to provide backward compatibility with existing data center equipment. For example, one current footprint is known as the small form-factor pluggable transceiver footprint (SFP). This footprint currently accommodates two LC-type ferrule optical connections. However, it may be desirable to accommodate four optical connections (two duplex connections of transmit/receive) within the same footprint. Another current footprint is the quad small form-factor pluggable (QSFP) transceiver footprint. This footprint currently accommodates four LC-type ferrule optical connections. However, it may be desirable to accommodate eight optical connections of LC-type ferrules (four duplex connections of transmit/receive) within the same footprint.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Over-stressing the cables and connectors may produce latent defects, compromise the integrity and/or reliability of the terminations, and potentially cause serious disruptions to network performance.

The reliability of communication infrastructure depends on secure connections between components, such as cable segments, network equipment, and communication devices. Such connections are continually exposed to dust, dirt, moisture, and/or other contaminants that may infiltrate the connections and degrade performance or even sever the connection between components. Conventional connection assemblies, such as typical fiber optic connectors, are generally not capable of providing an adequate seal to fully prevent the ingress of unwanted fluids (for instance, water) or solid contaminants. Fiber optic network segments are particularly vulnerable because fiber optic connections require extremely precise termination and alignment between connected components and cable segments that may be disrupted by the presence of fluid or solid contaminants. As such, fiber optic network segments connected using conventional technology are very susceptible to performance and/or availability degradation over time. Accordingly, telecommunication network providers would benefit from a connection assembly capable of maintaining a sealable and secure connection configured to prevent the ingress of unwanted materials into the connection assembly.

SUMMARY OF INVENTION

A mini IP (ingress protected) connector with a removably attached coupling nut or sleeve. Upon removing the coupling nut, the overall outer dimension of the IP connector is reduced thereby allowing the connector to be inserted or routed through an opening with a small diameter than the outside dimension of the coupling nut. The connector once assembled as described below, the coupling nut is removed and the connector routed, then the retainer nut is reattached.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

An adapter is a device with one or more openings configured to accept a connector. An adapter further comprises a housing, and one or more locking mechanism external or internal to the housing. An internal lock may secure a connector within an opening, and an external lock may secure adapter assembly, the latter including connectors, to a panel using a locking nut. A connector is inserted and secured at either end of adapter, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector may generally be defined by a connector housing body, an external latch or recess to secure said connector into adapter opening and one or more ferrules having optic fibers therein. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments described herein generally provide a replaceable and/or removable, detachable coupler nut secured around a portion of a body of a mini-IP connector. Removing coupling nut from an outer body of connector housing or a body reduces an outer diameter of IP connector substantially, over the prior, thereby allowing IP connector to be inserted through a small inner diameter conduit.

Figure 1A:
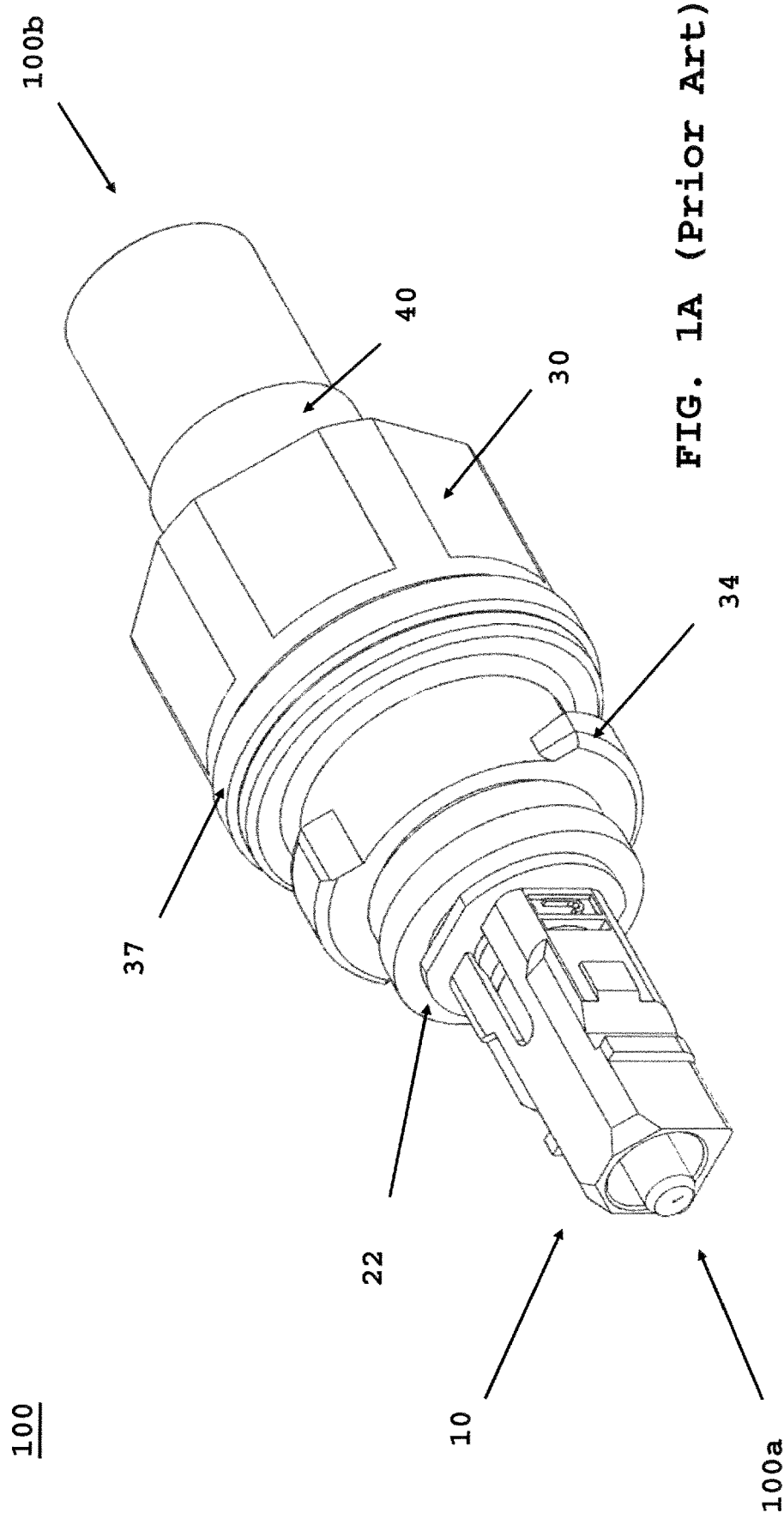
FIG. 1A is a perspective view of a prior art ingress protected (IP) fiber optical connector with a non-removable coupling nut with a SC connector at a first end.

FIG. 1A shows a perspective view of a prior art IP connector 100 without removable coupling nut 30. Connector 100 contains lock 34 to secure connector 100 within a first opening of bulkhead adapter 102 (FIG. 2B). Lock 34 may be a quarter turn bayonet lock as shown. Coupling nut 30 is fitted up against compression ring 37 that helps secure nut 30 from rotating while in an adapter. Connector 100 has sealing surface 22 that protects against moisture ingress, and fiber optic connector 10, in this FIG. 1A a SC fiber optic, at proximal end 100a and crimp ring 40 at distal end 100b.

Figure 2A:
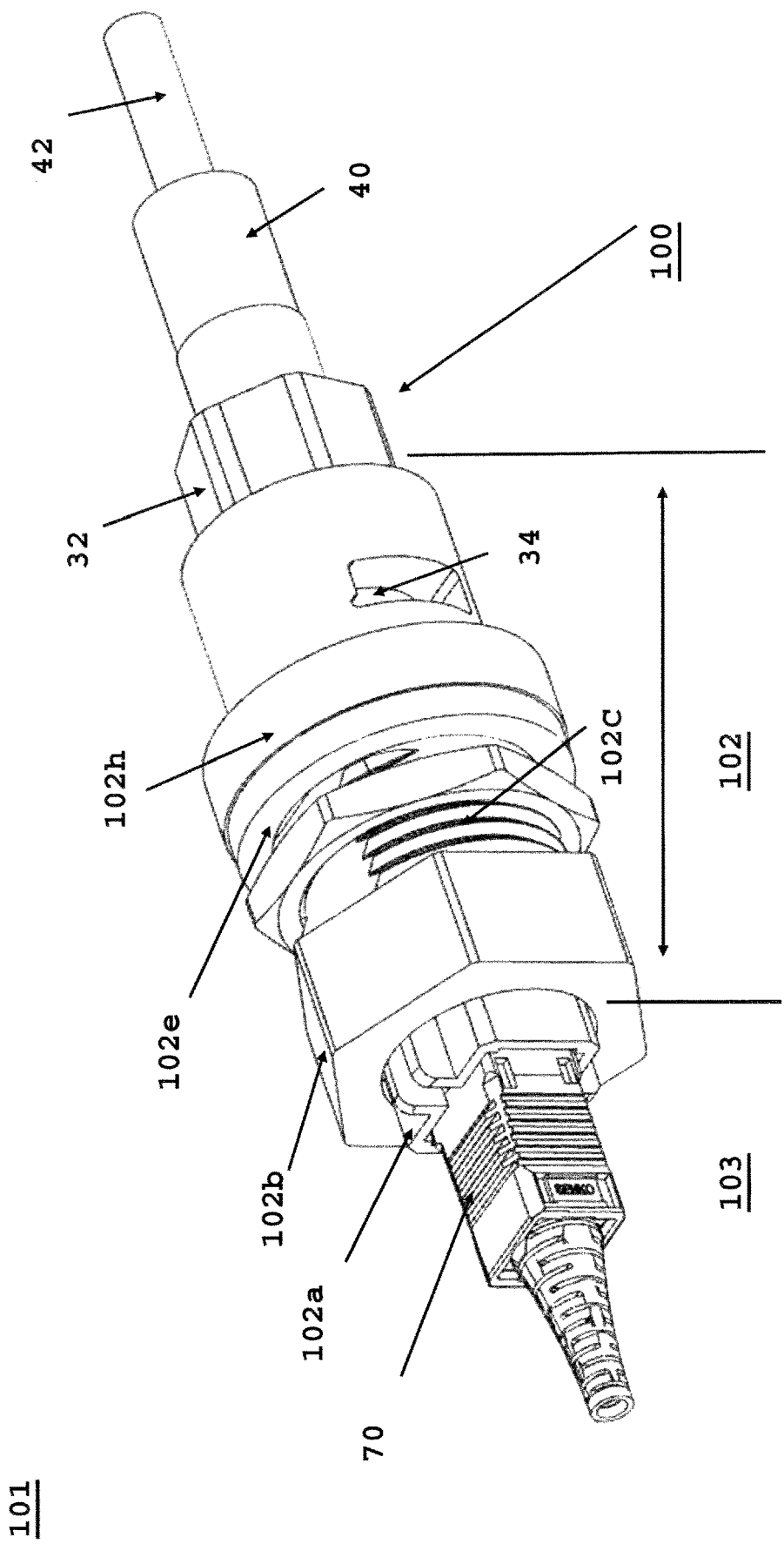
FIG. 2A is a perspective view of a prior art IP system with the connector of FIG. 1 installed into a bulkhead adapter at the second end and with a second fiber optic connector at a first end of the adapter.
Figure 2B:
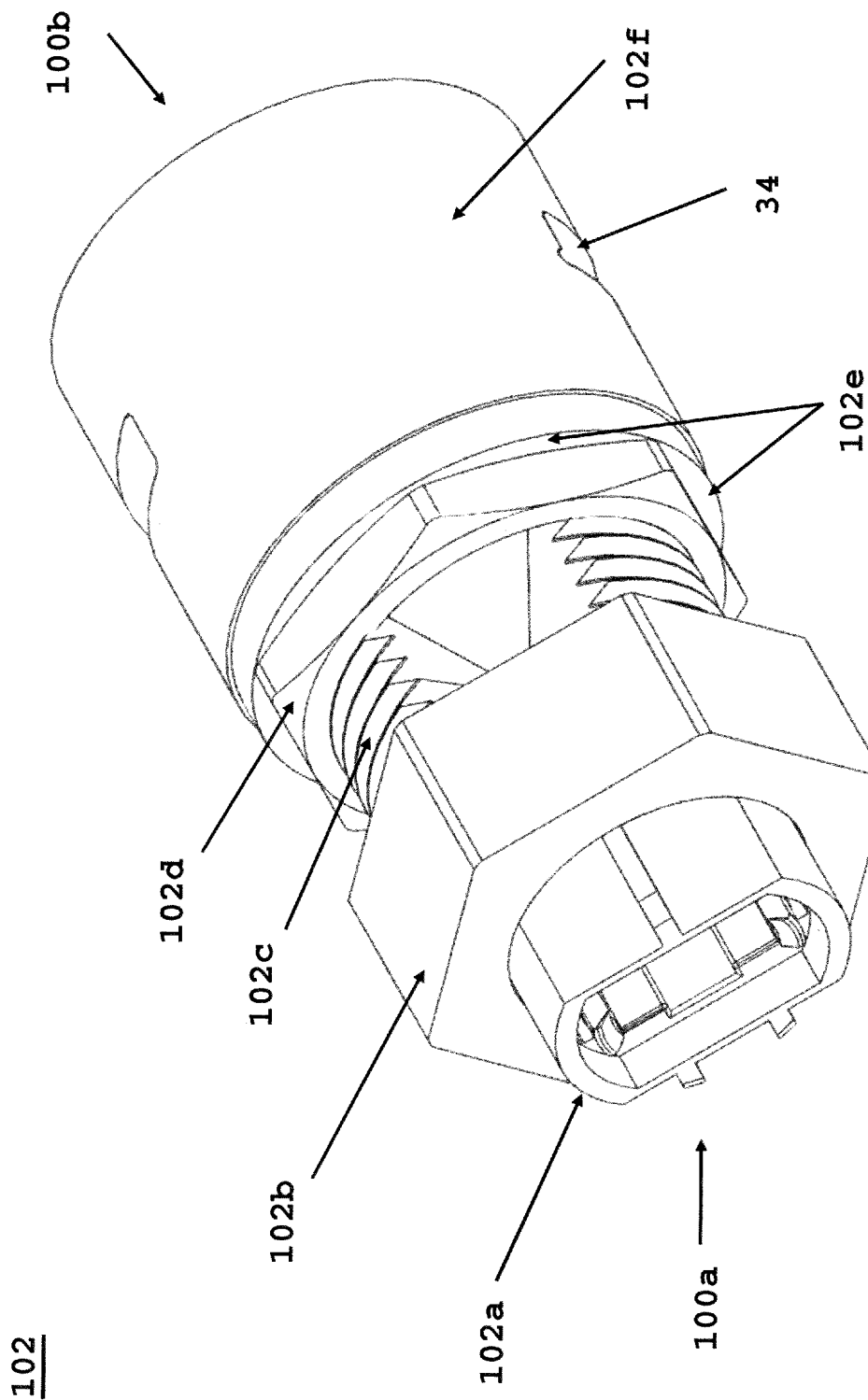
FIG. 2B is a perspective view of a prior art bulkhead adapter configured to accept the connector of FIG. 1.

FIG. 2A depicts IP connector 100 and adapter 102 interconnected as system 101. IP connector 100 may include removable, replaceable coupling nut 32 or sleeve (refer to FIG. 3A) in place of IP connector 100. IP connector 100 is inserted into a distal end of bulkhead adapter 102 (refer to FIG. 2B having MPO as the first fiber optic connector at a first end of the connector assembly), and IP connector 100 is secured within bulkhead 102 with a quarter turn of lock 34. At a proximal end of bulkhead adapter 102, second fiber optic connector 70 (in this drawing SC) is inserted and secured within SC adapter 102a. Locking nut 102b secures SC adapter 102a via threaded body 102c to second connector 100 located at a distal end of body 102c with a SC connector at a first end as depicted in FIG. 1. As depicted in FIG. 2A, IP connector 100 is secured within bulkhead adapter 102 using quarter-turn bayonet lock 34. To provide ingress protection, "IP", compression ring 37 seals up against inner surface of flange 102h, face 102e provides a sealing surface against a panel surface not shown. Crimp ring 40 secures cable 42 at a distal end of IP connector 100. Cable 42 is secured by crimp ring from being dislodged during use. Adapter 102 accepts and secures SC adapter 102 with SC connector 70 at a first end or proximal end 100 of bulkhead adapter 102, and accepts and secures IP connector 100 at a distal end 100b.

A prior art IP assembly with a one-piece coupling nut is disclosed in U.S. Pat. No. 9,448,369 Gniadek assigned to the assignee of the present invention. One-piece coupling nut 318 shown in FIG. 3, of Gniadek, is substantially larger than the outer diameter of connector housing 302. The present invention provides a solution to reduce the coupling nut but used as part of IP connector 100 to reduce overall outside dimension, so the IP connector can be inserted into an opening with a smaller inner diameter. As described below, the two-part coupling nut or two-piece sleeve is removed prior to inserting into a conduit, then secured about connector body 20 or a portion of the connector body after exiting conduit.

FIG. 2B depicts bulkhead adapter 102 with a first opening at proximal end 100a. The opening has connector adapter 102a therein, and in this embodiment the bulkhead adapter is configured to receive a MPO connector (not shown) therein. Other adapter types, such as LC or SC, can be used without departing from the scope of the invention. Second opening located at distal end 100b, is configured to receive IP connector 300 (refer to FIG. 3A). Outer housing 102f contains structure therein to engage and lock with bayonet lock 34 located at outer housing of IP connector 101 or IP connector 300. Panel locking nut 102d is turned clockwise to secure adapter 102 to a panel wall (not shown). Locking nut 102b secures connector adapter 102a to bulkhead adapter via threads 102c.

Figure 3A:
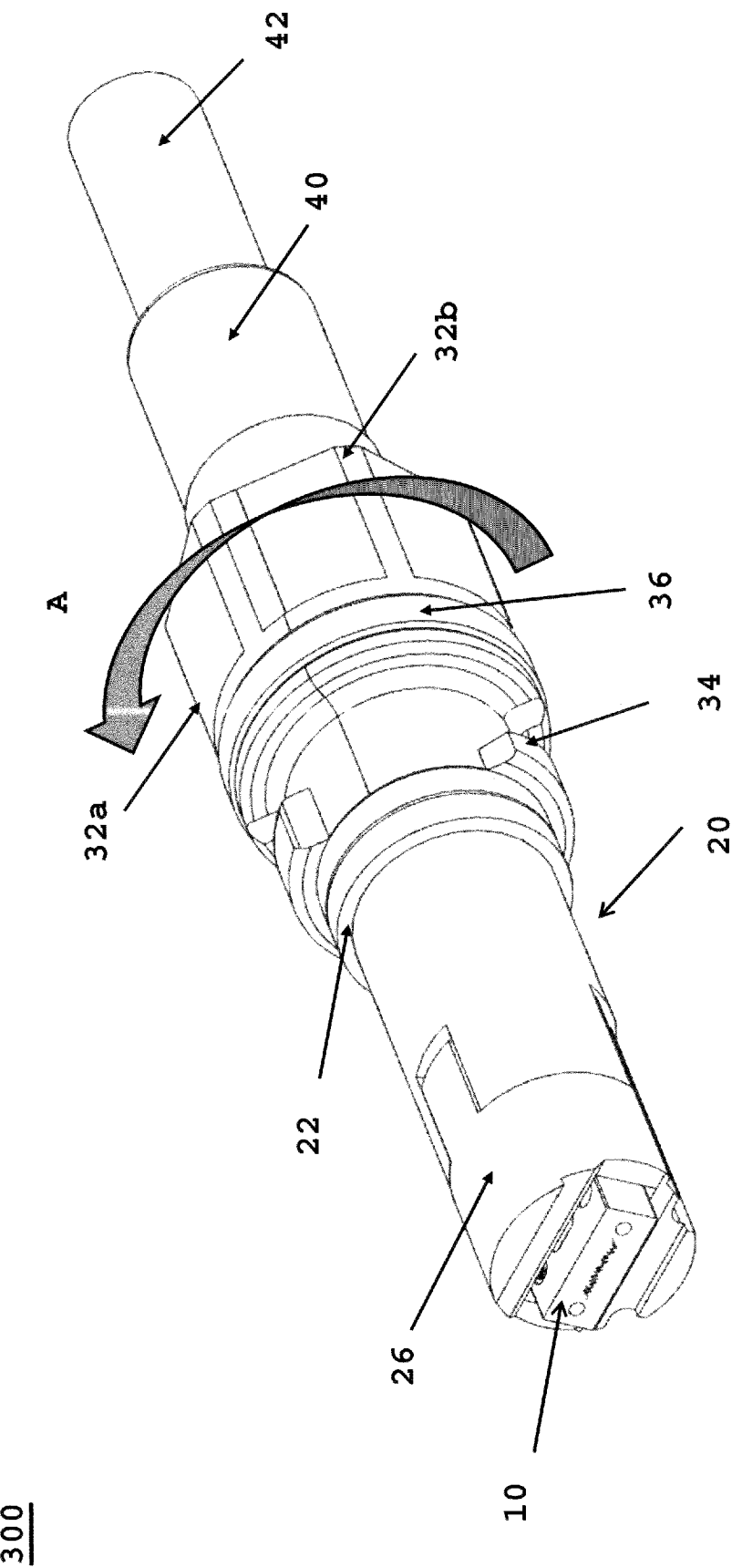
FIG. 3A is a perspective side view of IP fiber optical connector with a removable, two-piece coupling nut or sleeve and a MPO fiber optic connector at a first end according to an embodiment of the present invention.

FIG. 3A depicts IP connector 300 according to an embodiment of the present invention, connector 300 having a replacable, removable coupling nut 32. Rotating connector 300 in direction of arrow "A" coupling nut 32 or sleeve secures connector 300 via bayonet lock 34 into adapter bulkhead 102. Connector 300 has MPO plug frame 26 housing MPO ferrule 10, at a proximal end of connector 300. Other plug frames such as SC plug frame may be used as depicted in FIG. 1A.

Figure 3B:
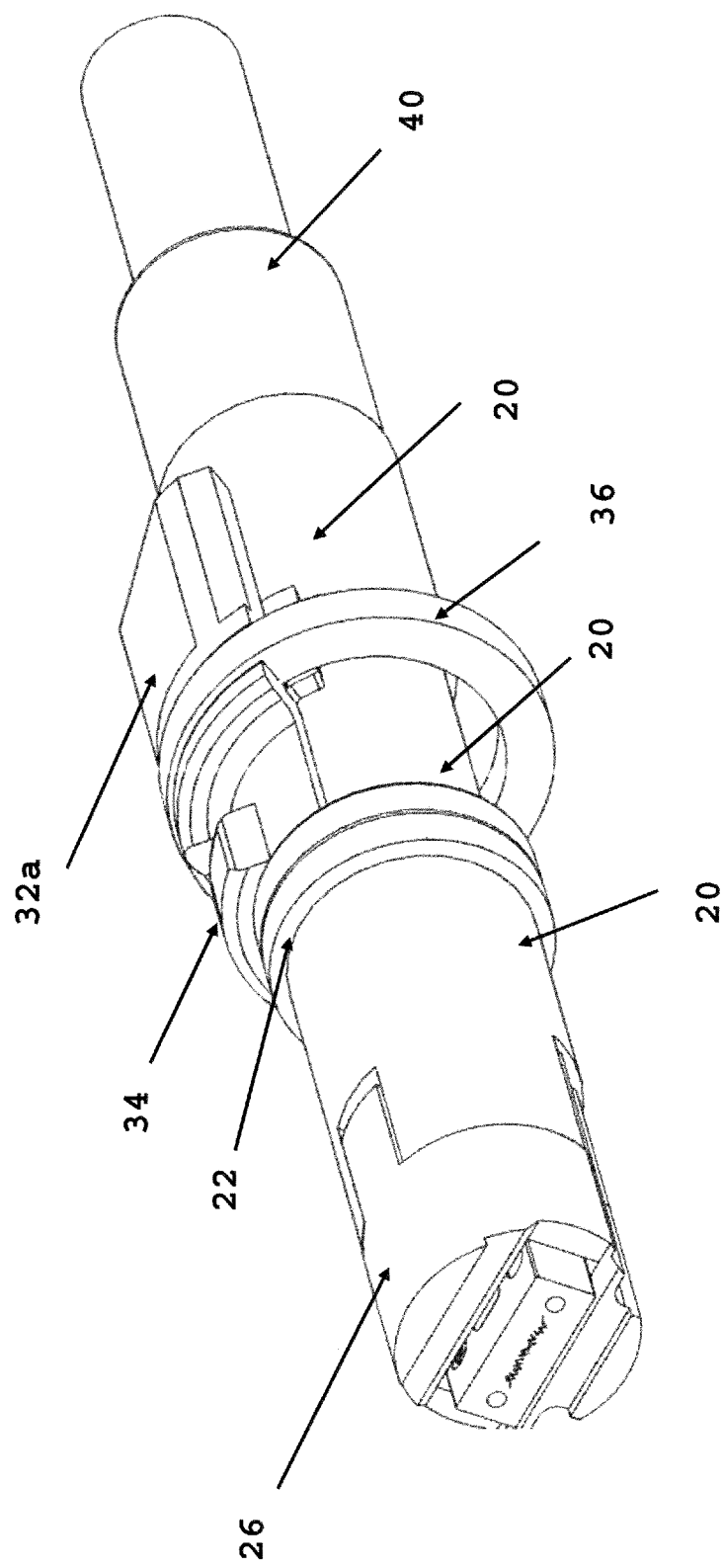
FIG. 3B is a perspective side view of IP MPO connector of FIG. 3A with bottom portion of coupling nut or sleeve removed.
Figure 3A:
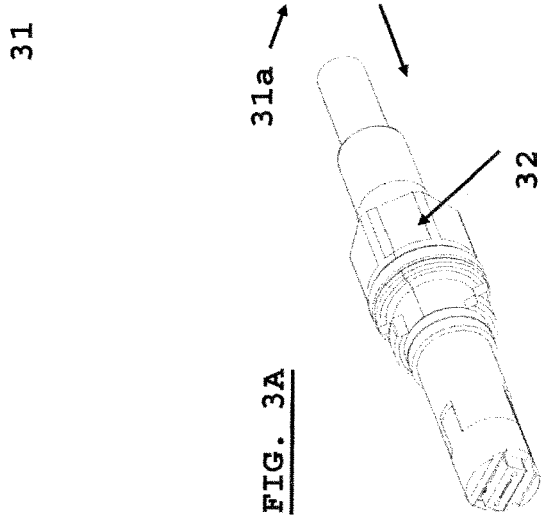

FIG. 3B depicts connector 300 with body portion 32b (refer to FIG. 4A) of coupling nut 32 removed exposing outer surface of connector body 20. First end 29 of connector 300 has a MPO fiber optic connector within connector body 20. Upon insertion into bulkhead adapter 102 after routing connector 300 through a conduit, the MPO connector at the first end is now the fiber optic connector at the second end of the bulkhead adapter 102. Compression seal 36 forms a watertight seal between coupling nut 32 body portions (32a, 32b) and locking portions of bayonet lock 34. Sealing surface 22 provides a further seal against water ingress. Crimp ring 40 adds a further seal against water ingress.

Figure 4A:
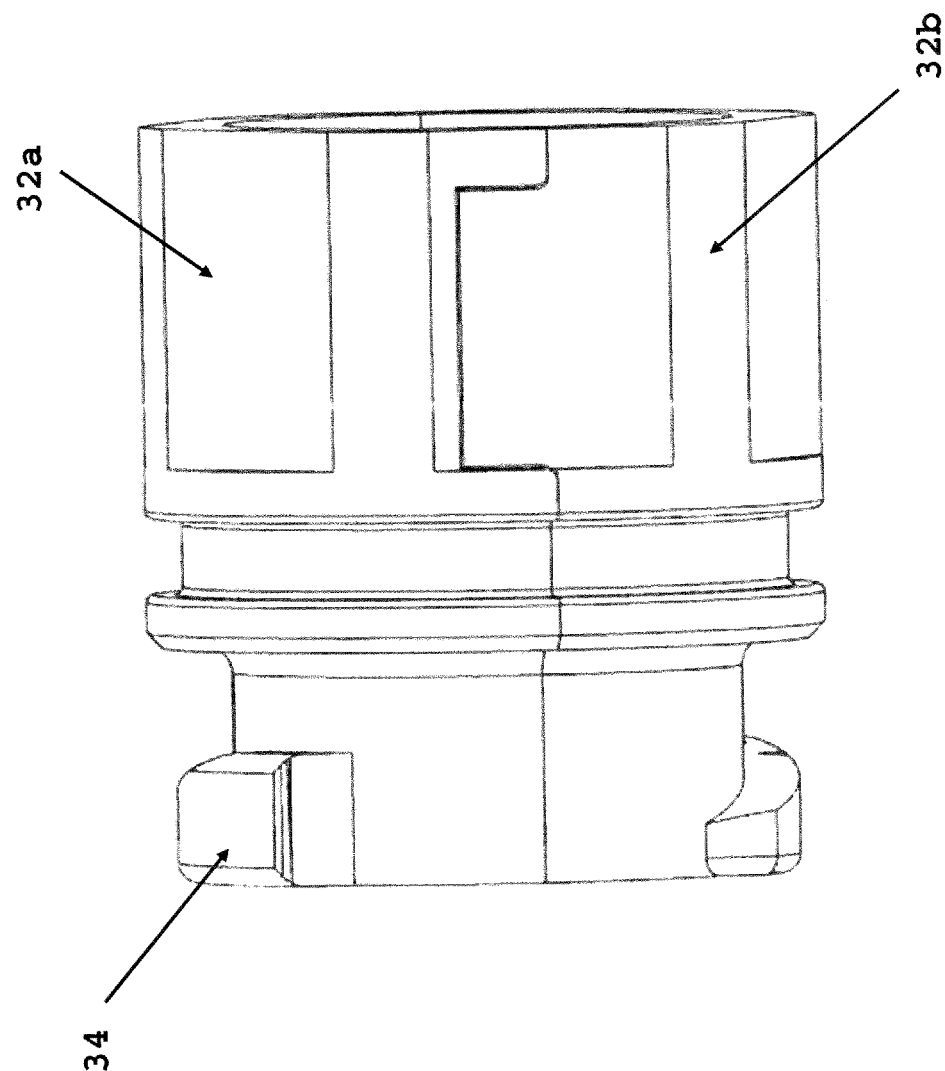
FIG. 4A is a perspective side view of coupling nut or sleeve according to an embodiment of the present invention.
Figure 4B:
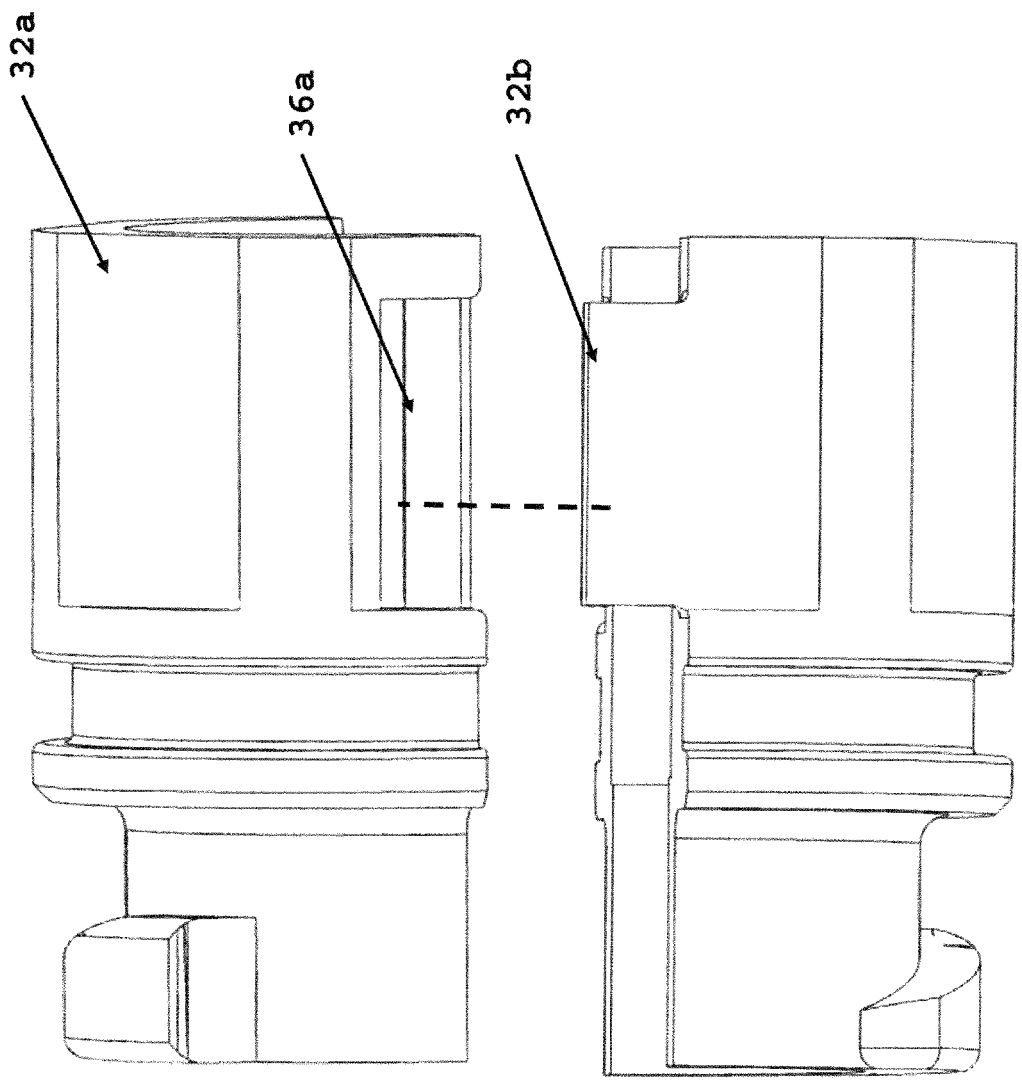
FIG. 4B is a perspective side view of coupling nut or sleeve of FIG. 4A separated into a top portion and bottom portion.

FIG. 4A depicts two-piece coupling nut 32 with top portion 32a and bottom portion 32b, with bayonet lock 34 at a first end. FIG. 4B depicts top portion 32a above bottom portion 32b, and the two portions are secured at dotted line by latch (38a, 38b) that snaps in or clicks in recess (36a, 36b) respectively.

Figure 4C:
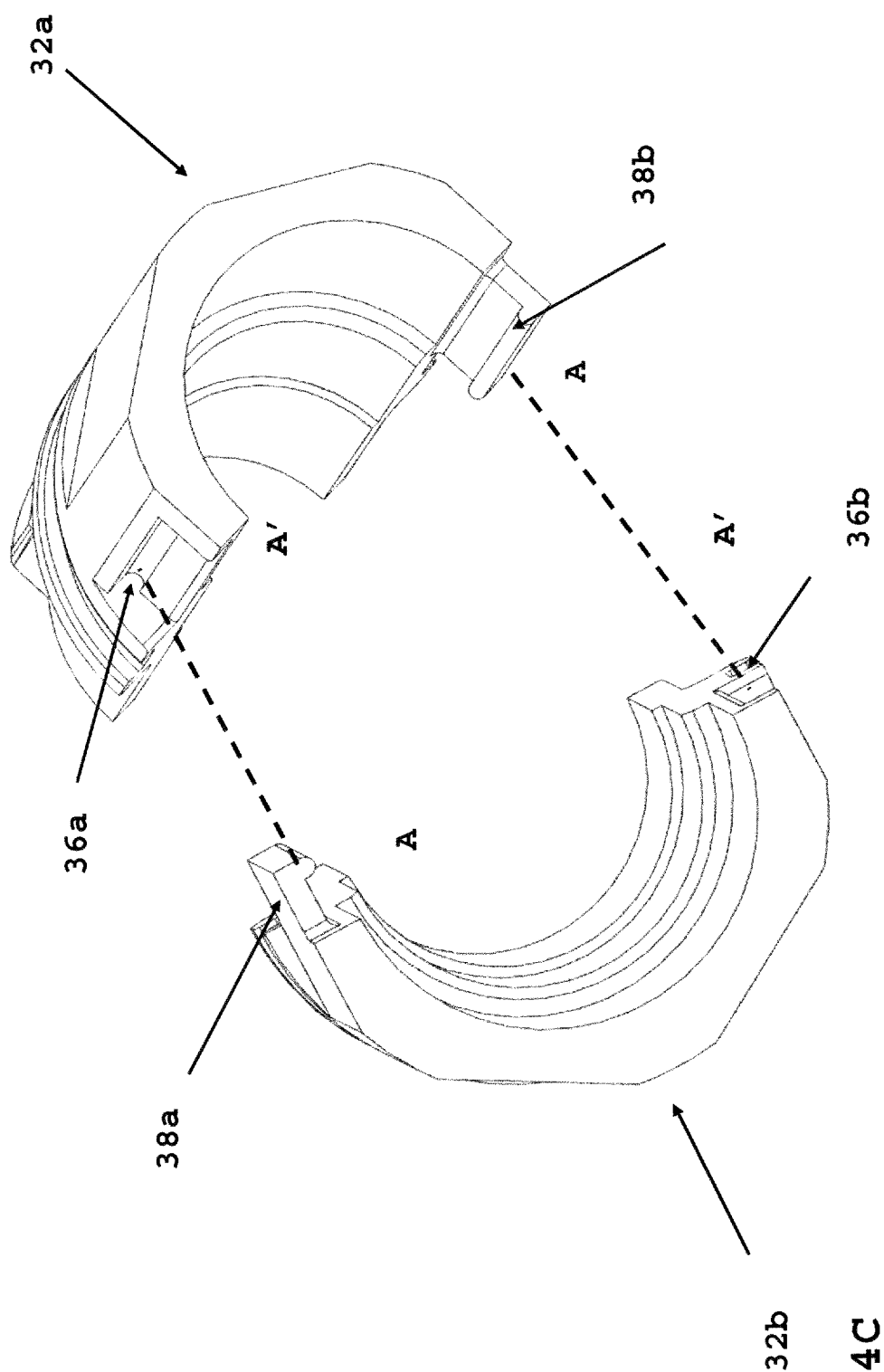
FIG. 4C is a perspective end offset-view of coupling nut of FIG. 4B.
Figure 4D:
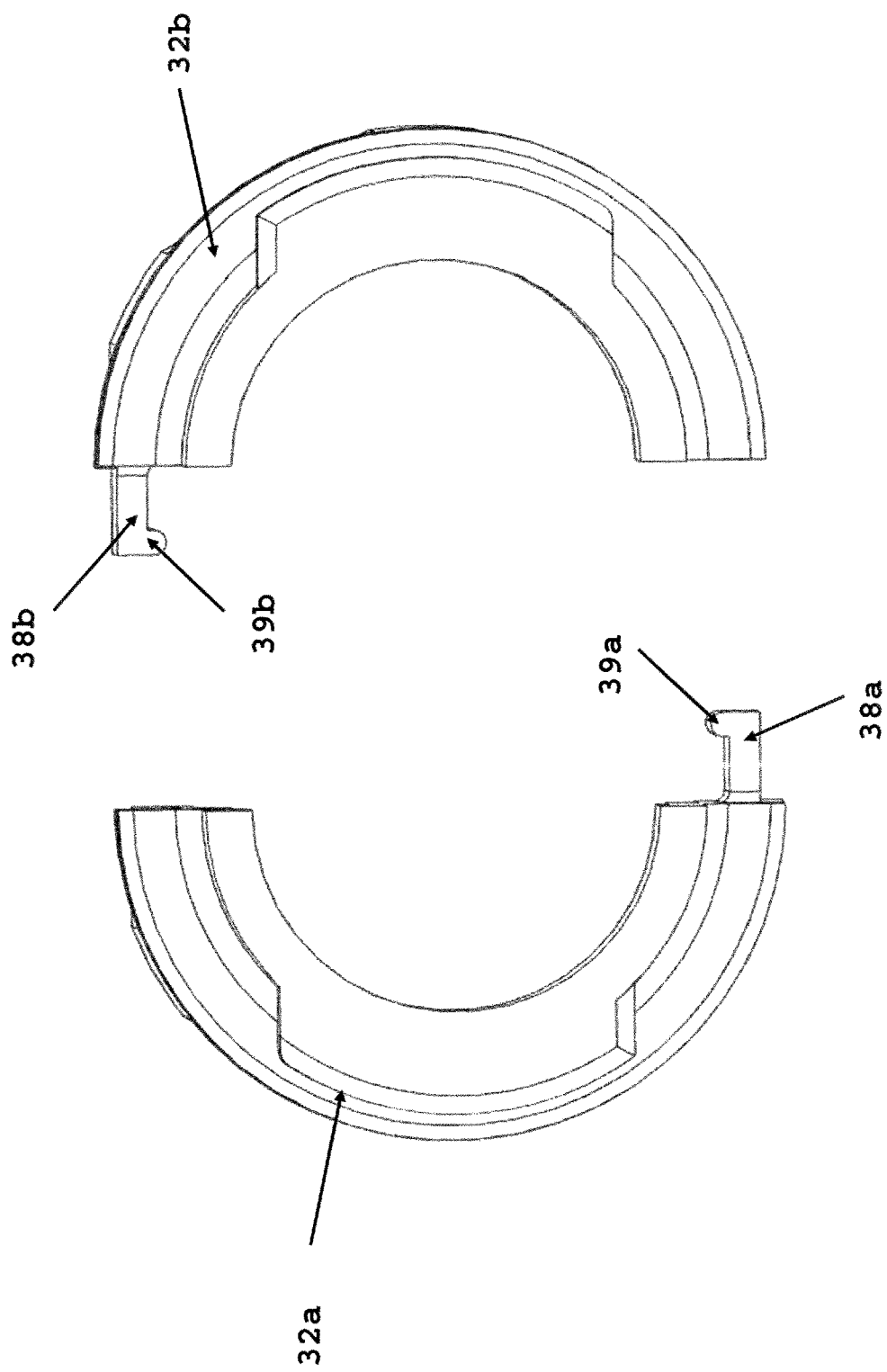
FIG. 4D is a perspective end view coupling nut of FIG. 4B.

FIG. 4C depicts an end view of top portion 32a and bottom portion 32b providing a side view of latch 38a showing lip that is receive within recess 36a at dotted line A-A'. Each body portion has a latch and corresponding recess on opposing sides. Likewise, latch 38b is received within recess 36b when top portion and bottom portion form coupling nut 32. A body portion may have a latch on opposing sides and mating body portion may have recesses on opposing sides. FIG. 4D is an end view of opposing, mating body portion (32a, 32b) prior to mating. Latch (38a, 38b) and its corresponding lip (39a, 39b) are shown.

Figure 5:
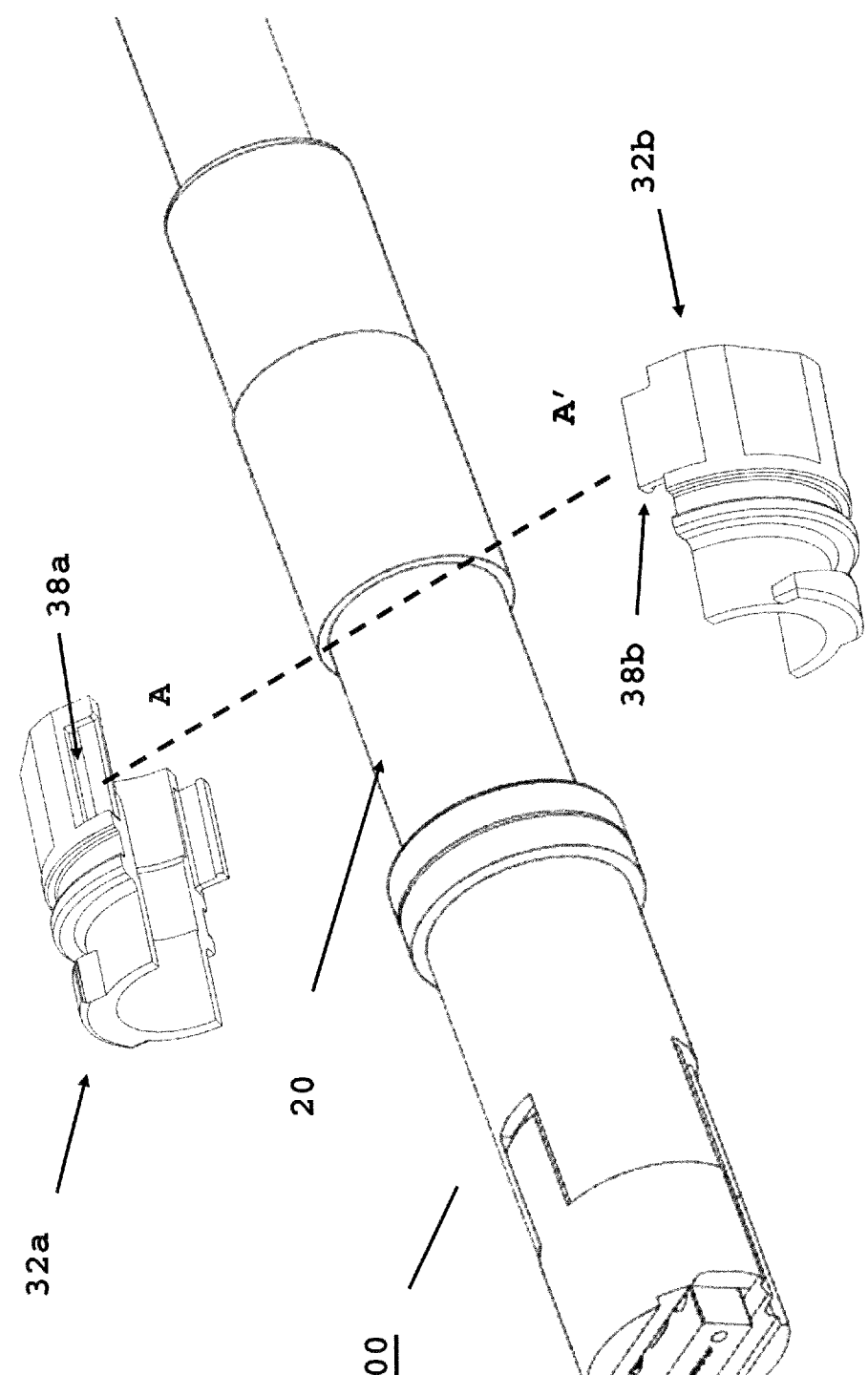
FIG. 5 is an exploded view of coupling nut prior to placement around a recessed portion of body of IP connector of FIG. 3A.
Figure 6A:
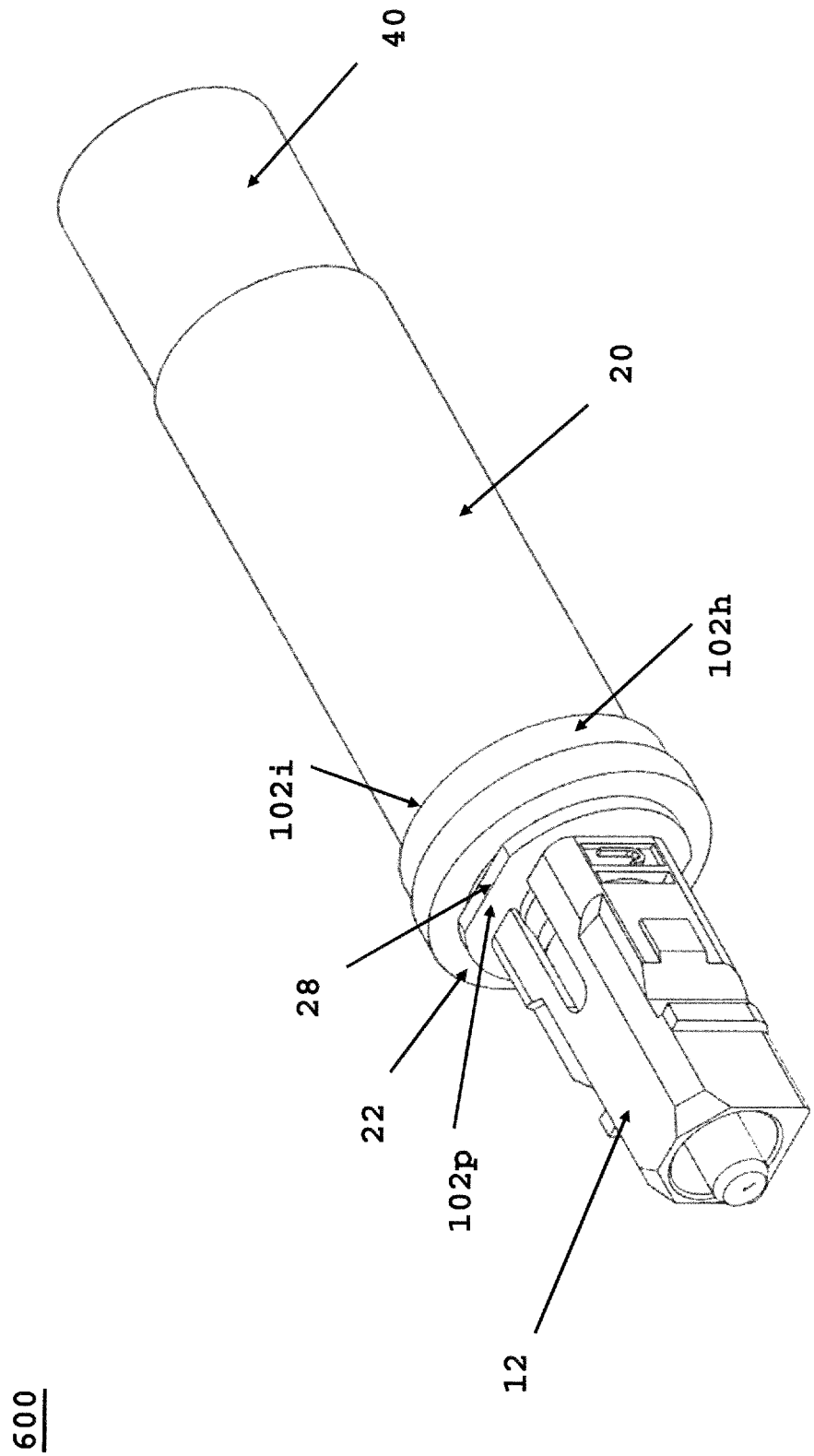
FIG. 6A is a perspective view of IP connector of FIG. 3A without coupling nut having a SC connector at a first end instead of a MPO fiber optic connector.

FIG. 5 depicts IP connector 300 prior to placement of coupling nut 32 comprising top and bottom body portions (32a, 32b) respectively about connector body 20. Portions (32a, 32b) are secured around body 20, and portions are mated along dotted line A-A'. Body 20 may have a recess as shown or no recess as depicted in FIG. 6A. Latch 38a is secured in recess 36a via lip 39a, thereby mating portions (32a, 32b) into single coupling nut 32. Corresponding latch 38b is secured in recess 36b via lip 39b. In operation, coupling nut is removed from or detached from body 20 prior to insertion of connector 101 through an opening (not shown) of an inner diameter less than outer diameter of nut 32 (FIG. 4A). The connector assembled, as shown in FIG. 3A, coupling nut 32 may be secured or mated together using a sleeve (not shown) placed over coupling nut 32.

Figure 6B:
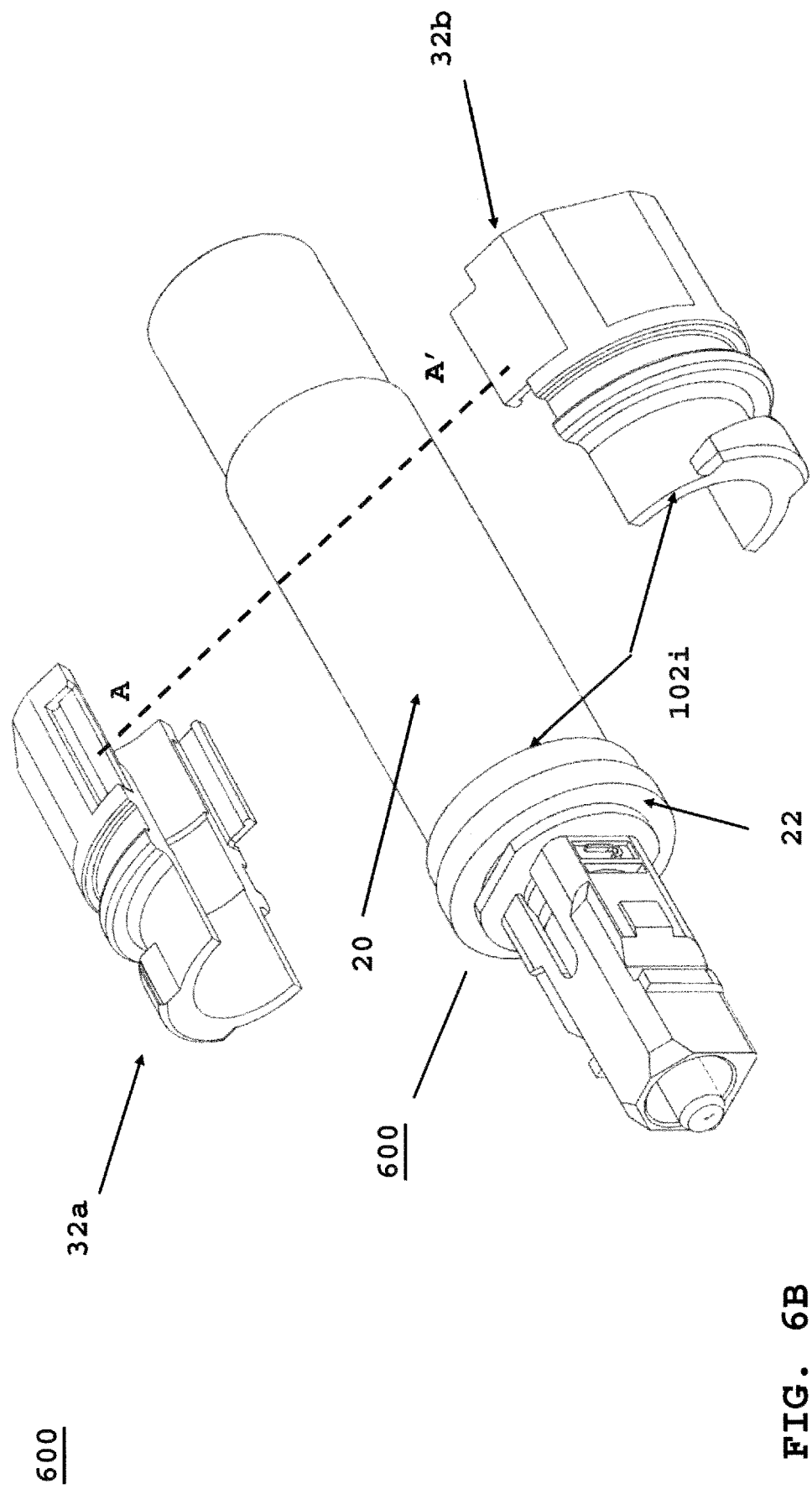
FIG. 6B is an exploded view of coupling nut prior to placement around a stepped portion of back of an IP connector without a recessed portion on the body.
Figure 6A:
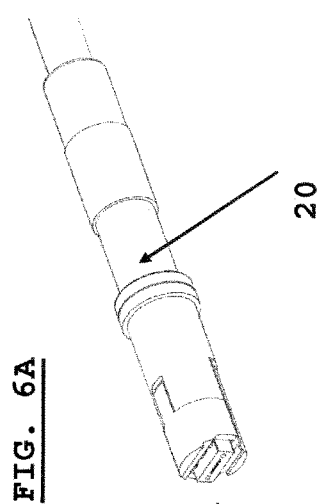
Figure 7:
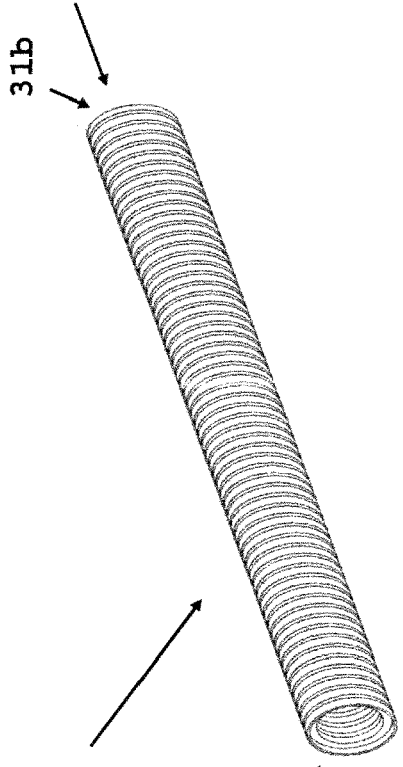
FIG. 7 is a perspective view of a conduit with an opening inner diameter greater than the outer diameter of connector body of FIG. 6A.

FIG. 6A depicts another embodiment of IP connector 300. Connector 600 secures a SC connector at a proximal end of body 20. SC plug frame 12 is inserted and secured in SC adapter 102p with cut-out or key 28 that prevents rotation while inserted into bulkhead adapter 102. Key 28 is used instead of bayonet lock 34. Flange 102h acts as a stop and sealing surface when mated with bulkhead adapter 102. FIG. 6B depicts connector 600 after insertion through an opening (not shown), further depicting placement of coupler portions (32a, 32b) mated along dotted line A-A' around connector body portion 20 and secured up against face 102i of sealing surface 22. FIG. 7 depicts a conduit 31 with an opening (31a, 31b) accepting an IP connector 300 without coupling nut 32, as shown in FIG. 6A, before connector 300 is passed through conduit 31. After passed through conduit 30, coupling nut 32 is secured about connector body 20.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. An optical fiber connector assembly comprising:
a connector body with a first end and a second end;
the first end configured to receive a first fiber optic connector and the second end configured to receive a fiber optic cable;
a replaceable coupling nut is placed about the connector body; and
wherein the coupling nut is removed from the connector body thereby allowing the optic fiber connector assembly to be inserted through an opening of an inner diameter less than an outer diameter of the fiber optic connector body with the coupling nut, and further wherein the top portion has a latch with a lip that is received in a recess on the opposing side of the top portion to secure the coupling nut about the connector body.

2. An optical fiber connector assembly according to claim 1, wherein the first end includes a MPO or SC fiber optic connector.

3. An optical fiber optical connector assembly according to claim 1, wherein the assembly is inserted into a bulkhead adapter at a second end, a first end of the bulkhead adapter has a fiber optic connector of the same type as the first end of the fiber optic optical connector assembly.

4. The fiber optic connector assembly according to claim 3, wherein the fiber optic cable assembly is secured into a distal end of a bulkhead adapter.

5. The fiber optic connector assembly according to claim 4, wherein securing the optic fiber cable assembly is providing a bayonet lock at a proximal end of the coupling nut, the lock secures the fiber optic cable assembly into the bulkhead adapter.

6. The fiber optic connector assembly according to claim 1, wherein the connector body has recess for receiving the coupling nut.

7. The fiber optic connector assembly according to claim 1, wherein the coupling nut is formed from a top portion and a bottom portion.

8. An optical fiber connector assembly comprising:
a connector body with a first end and a second end;
the first end is configured to receive a first fiber optic connector and the second end is configured to receive a fiber optic cable;
a replaceable coupling nut is placed about the connector body;

wherein the replaceable coupling nut is removed from the connector body thereby allowing the optic fiber connector assembly to be inserted through an opening of an inner diameter less than an outer diameter of the fiber optic connector body with the replaceable coupling nut; and further comprising the steps of:

removing the replaceable coupling nut placed about a body of the optic fiber connector assembly;

inserting the optic fiber cable assembly through a conduit;

securing the replaceable coupling nut about the body after the optic fiber cable assembly is placed through the conduit to a distal end of a bulkhead adapter; and providing a bayonet lock at a proximal end of the coupling nut, the bayonet lock secures the fiber optic cable assembly with the bulkhead adapter.

* * * * *